(12) United States Patent
Shattuck

(10) Patent No.: US 9,167,330 B1
(45) Date of Patent: Oct. 20, 2015

(54) CRICKET SYSTEMS

(71) Applicant: Robert S. Shattuck, Long Island City, NY (US)

(72) Inventor: Robert S. Shattuck, Long Island City, NY (US)

(*) Notice: Subject to any disclaimer, the term of this patent is extended or adjusted under 35 U.S.C. 154(b) by 0 days.

(21) Appl. No.: 14/496,389

(22) Filed: Sep. 25, 2014

Related U.S. Application Data

(60) Provisional application No. 61/882,518, filed on Sep. 25, 2013.

(51) Int. Cl.
*H04R 25/00* (2006.01)
*H04R 1/10* (2006.01)
*H02G 11/02* (2006.01)
*H04R 5/033* (2006.01)

(52) U.S. Cl.
CPC ............. *H04R 1/1033* (2013.01); *H02G 11/02* (2013.01); *H04R 1/1016* (2013.01); *H04R 5/033* (2013.01); *H04R 2499/10* (2013.01)

(58) Field of Classification Search
CPC .... H04R 1/1016; H04R 1/1033; H04R 5/033; H04R 2201/107; H04R 2499/11; H04R 1/10; H04M 1/6041; H04M 1/6058

USPC .................. 381/309, 74, 370, 376, 380, 384; 379/430, 438; 455/575.1, 575.2, 575.6, 455/575.8; 242/378, 378.1, 378.2, 378.4
See application file for complete search history.

(56) References Cited

U.S. PATENT DOCUMENTS

| | | | | |
|---|---|---|---|---|
| 4,942,617 | A * | 7/1990 | Boylan | 381/182 |
| 5,339,461 | A * | 8/1994 | Luplow | 455/351 |
| 5,422,957 | A | 6/1995 | Cummins | |
| 5,684,883 | A | 11/1997 | Chen | |
| 6,626,390 | B2 | 9/2003 | Albert et al. | |
| 6,834,820 | B2 * | 12/2004 | Wei | 242/378 |

* cited by examiner

*Primary Examiner* — Huyen D Le
(74) *Attorney, Agent, or Firm* — RG Patent Consulting, LLC; Rachel Gilboy

(57) ABSTRACT

A portable storage device within which earbud cords are able to be neatly stored and easily accessed to untangle the world from earbud cords, providing consumers with a more user friendly means of listening to music while exercising or engaging in normal daily activities without the user becoming tangled in cords, as well as providing a unit for storing and transporting earbuds in a pocket or purse without risking damage to these loose cords.

18 Claims, 5 Drawing Sheets

CRICKET SYSTEMS

CROSS-REFERENCE TO RELATED APPLICATION

The present application is related to and claims priority from prior provisional application Ser. No. 61/882,518, filed Sep. 25, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of cord retraction and storage devices and more specifically relates to a headphone cord retraction system.

2. Description of the Related Art

Many individuals in modern society enjoy listening to music. The way we listen to music has changed drastically in recent years. The days of playing scratchy 45's on a turntable are gone forever and it seems like even the revolutionary compact disc is quickly becoming a relic of the past. Millions of consumers now play their music on a device called an MP3 player. An MP3 player is a digital audio player or "DAP"; a portable electronics device that stores, organizes and plays audio files. Some DAPs, such as Zune audio players and iPods® are referred to as portable media players as they have image viewing or video playing support software. Most DAPs are powered by rechargeable batteries and are convenient for portable use.

Although many MP3 players can be connected to stereo systems enabling consumers to enjoys a surround sound experience, most consumers who own these devices listen to their music through headphones that are connected to the player via elongated power cords. These systems may feature earbuds which are inserted into the ears; music played through an MP3 player is crystal clear and can be enjoyed at even top volume without compromising sound integrity. Perhaps the only drawback associated with listening to music through a set of earbuds has to do with the earbud's power cords. Typically, consumers will tuck an MP3 player into a pocket, or utilize an arm band holder to store the player during use; the wiring dangling as an obstruction which is not typically desirable.

Unfortunately, the elongated power cords which connect the headphones to the player then dangle freely about and can become easily tangled. Whether one enjoys listening to music while working at a job site, exercising at the gym, or if one is using their earbuds to converse on their cellular telephone, these elongated cords can become easily knotted and pulled loose from the sound producing source. As many consumers would readily attest, there is little more frustrating than having to continuously stop in the middle of a satisfying workout or other such activity to unwind cords from weight and tension bars for example.

Further, after using their MP3 player, most consumers are faced with the challenge of what to do with their earbud's when storing the device. If left loose, earbud cords can become a tangled mess, especially if stored in a pocket or gym bag. As can be imagined, attempting to enjoy a favorite podcast while working out, only to spend several minutes untangling earbud cords can be an extremely frustrating experience. Further, storing delicate headphones in such an unsecured fashion can result in them coming loose, as well as becoming frayed, pinched and otherwise damaged when placed in a gym bag, purse or back pack for transport.

Various attempts have been made to solve problems found in retraction systems for managing earphone or headphone cords art. Among these are found in: U.S. Pat. No. 5,422,957 to Robert C. Cummins; U.S. Pat. No. 6,626,390 to Wilma Albert et al; and U.S. Pat. No. 5,684,883 to Tonny Chen. This prior art is representative of retraction systems for managing earphone or headphone cords.

Ideally, an headphone cord retraction system should provide a convenient a tangle-free means to store headphones/earbuds and associated wiring and, yet would operate reliably and be manufactured at a modest expense. Thus, a need exists for a reliable headphone cord retraction system to avoid the above-mentioned problems.

BRIEF SUMMARY OF THE INVENTION

In view of the foregoing disadvantages inherent in the known cord retraction and storage devices art, the present invention provides a novel headphone cord retraction system. The general purpose of the present invention, which will be described subsequently in greater detail is to provide a convenient, compact and user-friendly means to efficiently store headphones and associated wiring for in-use and non-use periods.

A headphone cord retraction system is disclosed herein, in a preferred embodiment, comprising: a headphone-cord-retraction-assembly including a housing assembly (comprising a front-housing-member, and a back-housing-member), and a retraction assembly (including a first-retraction-wheel with a first-retraction spring, a second-retraction-wheel with a second-retraction spring, and a third-retraction-wheel with a third-retraction spring). As such, the headphone cord retraction system comprises the headphone-cord-retraction-assembly; wherein the headphone-cord-retraction-assembly comprises in functional combination the housing assembly, and the retraction assembly.

The housing assembly comprises in coupled communication the front-housing-member and the back-housing-member which envelopes the retraction assembly to provide substantially enclosed storage means for headphone wiring, the headphone wiring able to be retracted for non-use conditions and extended to a user-determined length for in use conditions. In preferred embodiments the housing assembly comprises outer-periphery-receivers for frictionally receiving the earbuds (during non-use conditions such that the earbuds do not dangle and are not easily damaged by impact forces). Further, the outer-periphery-receivers are structured and arranged to allow the first headphone and the second headphone to be inserted therein to prevent the first headphone and the second headphone from ingressing into the housing assembly during the non-use condition. The user can access the earbuds with relative ease since this feature is provided.

Referring now to the headphone wiring; the headphone wiring is attached on a first-terminal-end to a first headphone and a second headphone is attached on a second-terminal-end and the headphone wiring is attached on a third-terminal-end to a jack. The jack is structured and arranged to removably-couple to a sound-providing source (such as an MP3 or the like). The headphone wiring may comprise a microphone for use with devices such as smart phones or the like.

The housing assembly preferably comprises a cylindrical profile when snap-coupled; wherein the housing assembly may in preferred embodiments comprise at least one hinge such that the front-housing-member and the back-housing-member are able to swing open and closed in relation to one another, suitable latching means are used to maintain closed conditions such that the housing may be opened as desired and remain closed during normal use.

The headphone wiring may be bifurcated a distance from the first-terminal-end and the second-terminal-end to allow for range of motion when inserting the first headphone and the second headphone into to the first-ear and the second-ear (to allow for head and neck clearance); wherein the first headphone and the second headphone are able to be removably coupled to a first-ear and a second-ear, respectively, of a user-wearer (repeatedly as desired). The first headphone and the second headphone are able to be removably coupled into a first-ear and into a second-ear; the first headphone and the second headphone comprising earbuds (other headphones may be externally mounted in relation to ears for listening).

The retraction assembly comprises in functional combination the first-retraction-wheel, the second-retraction-wheel, and the third-retraction-wheel; wherein the first-retraction spring, the second-retraction spring, and the third-retraction spring operate in substantial unison to allow evenly displaced retraction and extension of the headphone wiring, as manipulated by the user-wearer (when pulled or when rewinding on reels/wheels). The retraction assembly comprises a ratcheting means suitable for stop-and-go control of the headphone wiring as it is pulled or retracted. The first-retraction-wheel, the second-retraction-wheel and the third-retraction-wheel each comprise a reel, as referred to previously; the reel(s) each having an inner diameter and sidewalls to collect wiring and dispense therefrom.

In preferred embodiments the first-retraction spring, the second-retraction spring, and the third-retraction spring control operation of the first-retraction-wheel, the second-retraction-wheel, and the third-retraction-wheel, respectively, such that the first-retraction-wheel, the second-retraction-wheel, and the third-retraction-wheel are able to be controllably-rotated to dispense-unwind and alternately receive-wind the headphone wiring about the first-retraction-wheel, the second-retraction-wheel, and the third-retraction-wheel(s). As such the wiring can be stopped at a desired length for listening to music and adjusted as needed. A clutching means may be used whereby a user pulls slightly the wiring before it is retracted and wiring can be stopped from retracting movement in increments.

In still referring to the retraction springs in greater detail; the first-retraction spring, the second-retraction spring, and the third-retraction spring are engaged into an in-tension state as the headphone wiring is extended out of the housing assembly to a desired stopping point whereby the headphone wiring is able to be temporarily held in stasis for an in-use condition. The first-retraction-wheel, the second-retraction-wheel and the third-retraction-wheel are preferably oriented within the housing assembly in a triangular orientation; the third-retraction-wheel nearest a bottom of the housing assembly when used, and the other remaining first- and second- retraction-wheels in an upper positioning in a side-by-side orientation. This feature promotes ease of use as the wiring is retracted and/or extended such that 'even feed' is maintained.

The first-retraction-wheel, the second-retraction-wheel and the third-retraction-wheel are able to freely rotate in relation to the housing assembly; the first-retraction-wheel, the second-retraction-wheel and the third-retraction-wheel mounted on a first-shaft, a second-shaft, and a third-shaft respectively. As such, once the user-wearer disengages the headphone wiring from the in-use condition into the non-use condition the headphone wiring is able to be sequentially retracted onto the first-retraction-wheel, the second-retraction-wheel, and the third-retraction-wheel, respectively for storage substantially within confines of the housing assembly.

A kit is disclosed herein including: the headphone-cord-retraction-assembly, the headphone wiring comprising the microphone, headphones, and jack and a set of user-instructions.

A method of using a headphone cord retraction system is also described herein comprising the steps of: extending headphone wiring from a housing assembly to a desired length for use, inserting a first headphone and a second headphone into to a first-ear and a second-ear of a user-wearer, plugging a jack into a sound-providing source, and listening to audible tones (music or the like). The method may further comprise the steps of removing the jack from the sound source, the earbuds from the ears and retracting the headphone wiring into the housing assembly via a retraction assembly. The device is able to be easily stored in this condition.

The present invention holds significant improvements and serves as a headphone cord retraction system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, headphone cord retraction system, constructed and operative according to the teachings of the present invention.

The various embodiments of the present invention will hereinafter be described in conjunction with the appended drawings, wherein like designations denote like elements.

DETAILED DESCRIPTION

Figure 1:
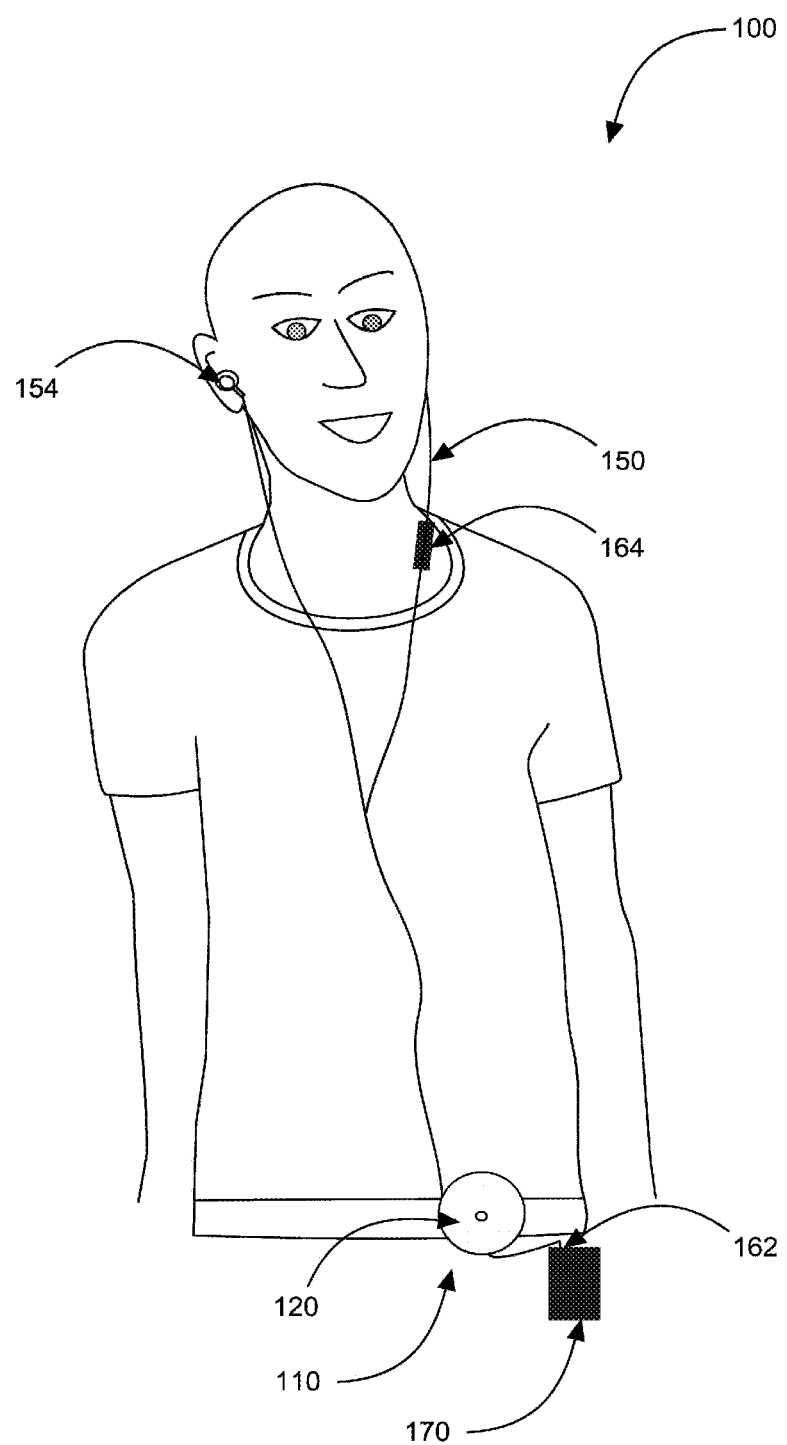
FIG. 1 shows a perspective view illustrating a headphone cord retraction system in an in-use condition according to an embodiment of the present invention.

As discussed above, embodiments of the present invention relate to a cord retraction and storage device and more particularly to a headphone cord retraction system, entitled 'cricket Systems' as used to improve the efficiency of storing headphones and associated wiring for in-use and non-use periods in a retractable and compact manner.

Generally speaking, the Cricket (headphone cord retraction system) is offered as an aftermarket accessory to be utilized in conjunction with existing headphones. Made available in circular, oval or triangular configurations, the Cricket may be comprised of a two-piece hinged or interlocking casing, comprising three, oval shaped openings positioned about the perimeter of the device to accommodate either earbud and the end of the earbud cord, respectively. Thus comprised of two pieces, the Cricket may be closed or snap fitted over existing headphone cords contained within.

Housed within the interior of the unit and mounted in a triangular configuration may be three, retractable or ratchet-style spools or reels, around which each piece of the elongated "Y" cording (which includes the cord for each ear bud and the cord below the point where the unit bifurcates) may be wound. These reels may have integrated notched fasteners that run the perimeter of each and serve to gently, yet securely hold the cording in place. To accommodate earbuds featuring an integrated microphone, a series of small, swivel mounted hinged holders may be positioned about the perimeter of the exterior of the Cricket and with which the user may secure the approximately 6 inches of cording that bridges the distance between the microphone and the actual earbud. In addition, 3 niches sized appropriately for each ear bud and the remainder of the plug-in cord may be located on the back of the unit housing to keep everything neatly tucked away and secure. The Cricket may be offered in a variety of vibrant colors, as well as understated neutral hues.

The Cricket may offer consumers a convenient, hassle-free means of storing their unwieldy earbuds during and following use of an MP3 player or similar audio device. Consumers should appreciate that while they exercise, enjoy a leisurely walk, clean house or engage in other activities while listening to their favorite music, audio books or podcast, they may release just enough cord from the Cricket so that the earbuds comfortably reached the ears, without the threat of becoming tangled in one's clothing, exercise equipment or other objects. In addition, once their designated activity is complete, the user may wind the remainder cording within the Cricket, providing effortless and orderly storage.

Eliminating the hassle associated with untangling cords that have become hopelessly disheveled when stored loosely in a gym bag, purse or backpack, this unique holder may provide a practical means of securing one's audio equipment. A sensible alternative to winding cords around the MP3 player itself, where they can become easily damaged and frayed (or otherwise damaged), use of the Cricket may spare the user the expense of replacing costly earbuds that have become irrevocably ruined because of haphazard storage. As such, use of the Cricket may save consumers money, aggravation, and time. Simple in design and practical in function, this uniquely designed storage tool may prove a favorite accessory of any music aficionado, as well as those who depend on earbuds when conversing on the phone, or utilizing a computer.

Referring to the drawings by numerals of reference there is shown in FIGS. 1-4, various views of headphone cord retraction system 100. Headphone cord retraction system 100 comprises: headphone-cord-retraction-assembly 110 including housing assembly 120 (comprising front-housing-member 122, and back-housing-member 124), retraction assembly 130 (including first-retraction-wheel 132 with first-retraction spring 134, second-retraction-wheel 136 with second-retraction spring 138, and third-retraction-wheel 140 with third-retraction spring 142); wherein headphone cord retraction system 100 comprises headphone-cord-retraction-assembly 110. Headphone-cord-retraction-assembly 110 comprises in functional combination housing assembly 120, and retraction assembly 130.

Housing assembly 120 comprises in coupled communication front-housing-member 122 and back-housing-member 124 which envelopes retraction assembly 130 to provide substantially enclosed storage means for headphone wiring 150; headphone wiring 150 able to be retracted for non-use conditions and extended to a user-determined length for in use conditions. Headphone wiring 150 is attached on first-terminal-end 152 to first headphone 154 and second headphone 158 is attached on second-terminal-end 156. Headphone wiring 150 is attached on third-terminal-end 160 to jack 162; wherein jack 162 is structured and arranged to removably-couple to sound-providing source 170 of choice. First headphone 154 and second headphone 158 are able to be removably coupled to a first-ear and a second-ear, respectively, of a user-wearer, as shown in FIG. 1. Housing assembly 120 may comprise at least one hinge (preferably side-mounted) such that front-housing-member 122 and back-housing-member 124 are able to swing open and closed in relation to one another to access headphone wiring 150 or to install/remove headphone wiring 150. It is preferred that the present invention comprise plastic due to its lightweight properties and cost-effective manufacture. Upon reading this specification, it should be appreciated that, under appropriate circumstances, considering such issues as user preferences, design preference, structural requirements, marketing preferences, cost, available materials, technological advances, etc., other material arrangements such as, for example, ferrous and non-ferrous materials, composites, non-plastics, etc., may be sufficient.

Retraction assembly 130 comprises in functional combination first-retraction-wheel 132, second-retraction-wheel 136, and third-retraction-wheel 140; wherein first-retraction spring 134, second-retraction spring 138, and third-retraction spring 142 operate in unison to allow evenly displaced retraction and extension of headphone wiring 150, as manipulated by the user-wearer.

First-retraction spring 134, second-retraction spring 138, and third-retraction spring 142 control operation of the first-retraction-wheel 132, second-retraction-wheel 136, and third-retraction-wheel 140, respectively, such first-retraction-wheel 132, second-retraction-wheel 136, and third-retraction-wheel 140 are able to be controllably-rotated to dispense-unwind and alternately receive-wind headphone wiring 150 about first-retraction-wheel 132, second-retraction-wheel 136, and third-retraction-wheel 140. First-retraction spring 134, second-retraction spring 138, and third-retraction spring 142 are engaged into an 'in-tension' state as headphone wiring 150 is extended out of housing assembly 120 (out of apertures or the like) to a desired stopping point whereby headphone wiring 150 is able to be temporarily held in stasis for an in-use condition. Once the user-wearer disengages headphone wiring 150 from the in-use condition into the non-use condition headphone wiring 150 is able to be sequentially (automatically) retracted onto first-retraction-wheel 132, second-retraction-wheel 136, and third-retraction-wheel 140, respectively for storage substantially within confines of housing assembly 120.

Figure 2:
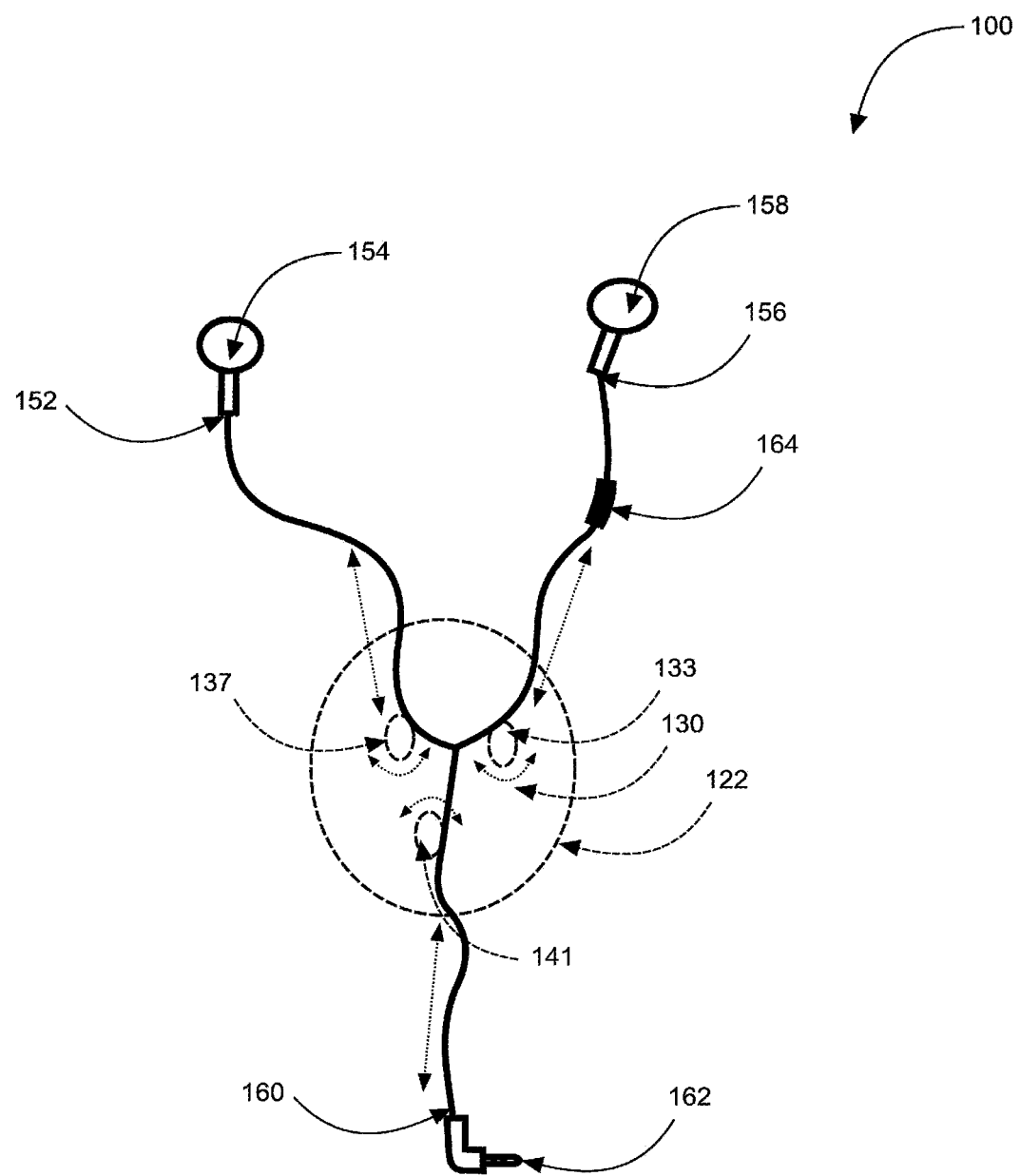
FIG. 2 is a perspective view illustrating a headphone-cord-retraction-assembly of the headphone cord retraction system according to an embodiment of the present invention of FIG. 1.
Figure 3:
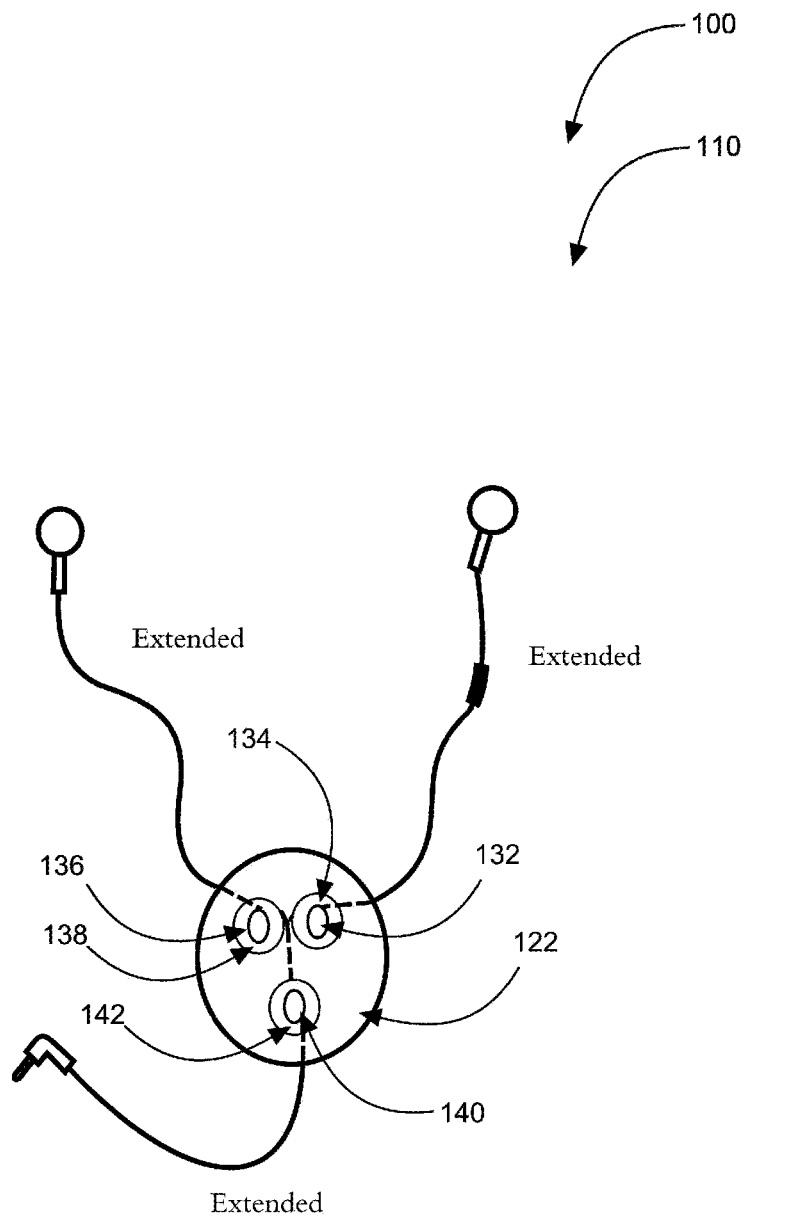
FIG. 3 is a perspective view illustrating the headphone-cord-retraction-assembly as equipped with retraction means for storing earbuds and associated wiring according to an embodiment of the present invention of FIG. 1.

Headphone wiring 150 as shown in FIGS. 2 & 3 may comprise microphone 164 for use with smart cellular phones, computers or the like. First headphone 154 and second headphone 158 are able to be removably coupled into a first-ear and a second-ear (of the user-wearer, as shown in FIG. 1); first headphone 154 and second headphone 158 may comprise earbuds (insertable versions). In alternate embodiments first headphone 154 and second headphone 158 are able to be removably coupled adjacent a first-ear and a second-ear; first headphone 154 and second headphone 158 external to the first-ear and the second-ear in these particular embodiments. Headphone wiring 150 may be bifurcated a distance from first-terminal-end 152 and second-terminal-end 156 to allow for range of motion when inserting first headphone 154 and second headphone 158 into to the first-ear and the second-ear.

Figure 4:
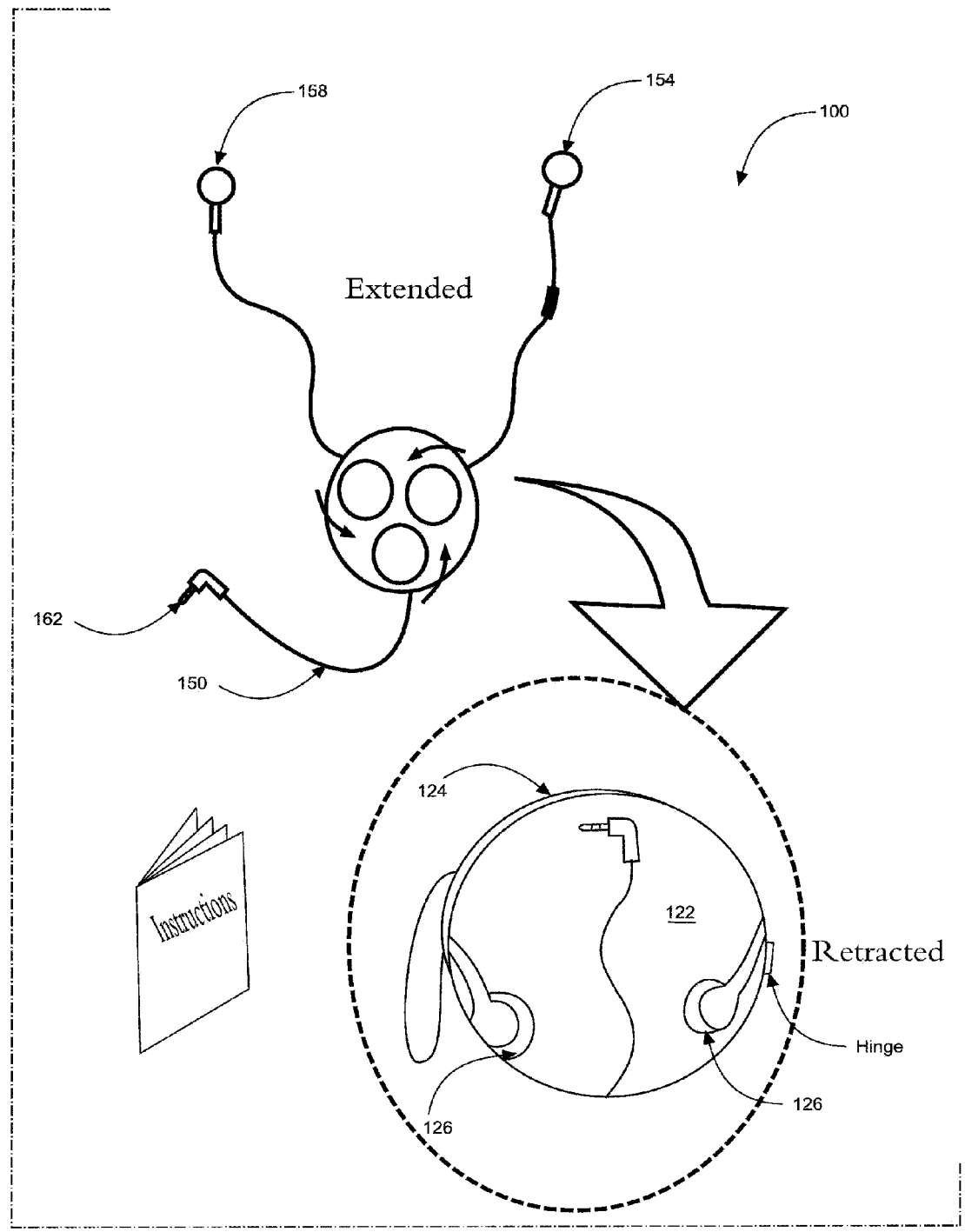
FIG. 4 is another perspective view illustrating the headphone-cord-retraction-assembly according to an embodiment of the present invention of FIG. 1.

Retraction assembly 130, as shown in FIGS. 2-4 comprises a ratcheting means suitable for stop-and-go control. Those with ordinary skill in the art will now appreciate that upon reading this specification and by their understanding the art of ratcheting means as described herein, methods of stop and go in increments via suitable resistance/clutching means will be understood by those knowledgeable in such art.

Referring now to housing assembly 120; housing assembly 120 comprises outer-periphery-receivers 126, as shown; wherein outer-periphery-receivers 126 are structured and arranged to allow first headphone 154 and second headphone 158 to be inserted therein to prevent first headphone 154 and second headphone 158 from ingressing into housing assembly 120 during the non-use condition. Outer-periphery-receivers 126 promote ease of user accessing first headphone 154 and second headphone 158 with relative ease. Front-housing-member 122 and back-housing-member 124 snap-couple together in certain embodiments; wherein housing assembly 120 comprises a cylindrical profile when 'snap-coupled'.

Referring back now to retraction assembly 130, as shown in FIGS. 2-4; first-retraction-wheel 132 and second-retraction-wheel 136 preferably rotate dependent on each other's relative rotational displacement. Rotation of third-retraction-wheel 140 is not dependent on displacement of the relative rotational displacement (distance turned) of first-retraction-wheel 132 and second-retraction-wheel 136. First-retraction-wheel 132 and second-retraction-wheel 136 and third-retraction-wheel 140 are able to freely rotate in relation to housing assembly 120; first-retraction-wheel 132 and second-retraction-wheel 136 and third-retraction-wheel 140 are mounted on first-shaft 133, second-shaft 137, and third-shaft 141 respectively. First-retraction-wheel 132, second-retraction-wheel 136 and third-retraction-wheel 140 each comprise a reel; wherein the first-retraction-wheel 132, second-retraction-wheel 136 and third-retraction-wheel 140 are oriented within housing assembly 120 in a triangular orientation; third-retraction-wheel 140 nearest a bottom of housing assembly 120 when used.

Headphone cord retraction system 100 may be sold as a kit as shown in FIG. 4 comprising the following parts: at least one headphone-cord-retraction-assembly 110; at least one headphone wiring 150 (with first headphone 154, first headphone 154, microphone 164, and jack 162; and at least one set of user instructions. The kit has instructions such that functional relationships are detailed in relation to the structure of the invention (such that the invention can be used, maintained, or the like in a preferred manner). Headphone cord retraction system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
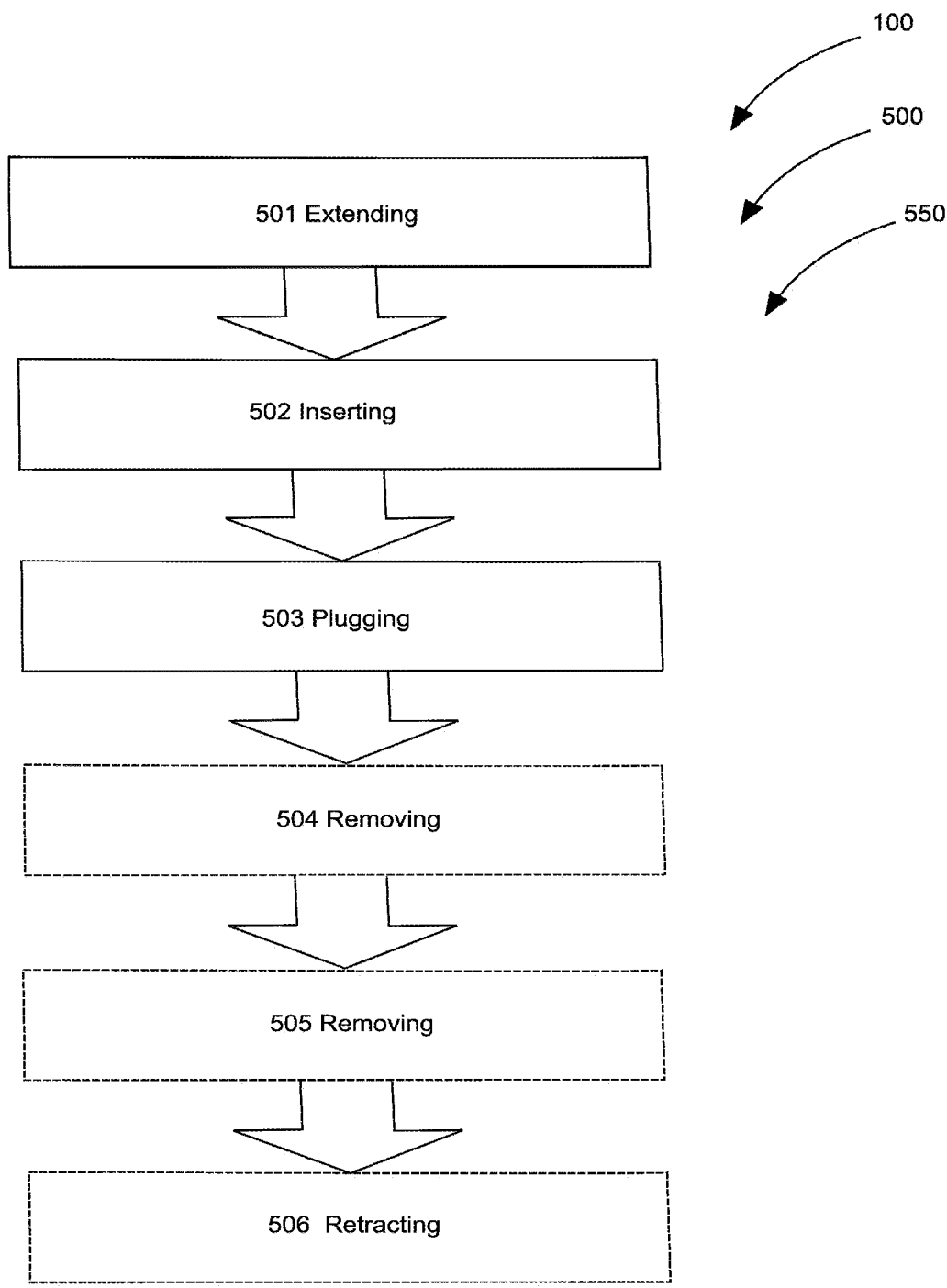
FIG. 5 is a flowchart illustrating a method of use for the headphone cord retraction system according to an embodiment of the present invention of FIGS. 1-4.

Referring now to FIG. 5, showing a flowchart 550 illustrating a method of use 500 for headphone cord retraction system 100 according to an embodiment of the present invention of FIGS. 1-4.

A method of using (method of use 500) headphone cord retraction system 100 comprises the steps of: step one 501 extending headphone wiring 150 from housing assembly 120 to a desired length for use, step two 502 inserting first headphone 154 and second headphone 158 into to a first-ear and a second-ear of a user-wearer, step three 503 plugging jack 162 into a sound-providing source 170, and listening to audible tones. The method 500 may further comprise the optional steps 504-506 of removing jack 162 from sound-providing source 170, the earbuds (first headphone 154 and second headphone 158) from the ears and retracting headphone wiring 150 into housing assembly 120 via retraction assembly 130.

It should be noted that step 504-506 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A headphone cord retraction system comprising:
   a headphone-cord-retraction-assembly including;
      a housing assembly comprising;

a front-housing-member; and
a back-housing-member; and
a retraction assembly including;
a first-retraction-wheel with a first-retraction spring;
a second-retraction-wheel with a second-retraction spring; and
a third-retraction-wheel with a third-retraction spring;
wherein said headphone cord retraction system comprises said headphone-cord-retraction-assembly;
wherein said headphone-cord-retraction-assembly comprises in functional combination said housing assembly, and said retraction assembly;
wherein said housing assembly comprises in coupled communication said front-housing-member and said back-housing-member which envelopes said retraction assembly to provide substantially enclosed storage means for headphone wiring, said headphone wiring able to be retracted for non-use conditions and extended to a user-determined length for in use conditions;
wherein said headphone wiring is attached on a first-terminal-end to a first headphone and a second headphone is attached on a second-terminal-end;
wherein said headphone wiring is attached on a third-terminal-end to a jack;
wherein said jack is structured and arranged to removably-couple to a sound-providing source;
wherein said first headphone and said second headphone are able to be removably coupled to a first-ear and a second-ear, respectively, of a user-wearer;
wherein said retraction assembly comprises in functional combination said first-retraction-wheel, said second-retraction-wheel, and said third-retraction-wheel;
wherein said first-retraction spring, said second-retraction spring, and said third-retraction spring operate in unison to allow evenly displaced retraction and extension of said headphone wiring, as manipulated by said user-wearer;
wherein said first-retraction spring, said second-retraction spring, and said third-retraction spring control operation of said first-retraction-wheel, said second-retraction-wheel, and said third-retraction-wheel, respectively, such that said first-retraction-wheel, said second-retraction-wheel, and said third-retraction-wheel are able to be controllably-rotated to dispense-unwind and alternately receive-wind said headphone wiring about said first-retraction-wheel, said second-retraction-wheel, and said third-retraction-wheel;
wherein said first-retraction spring, said second-retraction spring, and said third-retraction spring are engaged into an in-tension state as said headphone wiring is extended out of said housing assembly to a desired stopping point whereby said headphone wiring is able to be temporarily held in stasis for an in-use condition; and
wherein once said user-wearer disengages said headphone wiring from said in-use condition into said non-use condition said headphone wiring is able to be sequentially retracted onto said first-retraction-wheel, said second-retraction-wheel, and said third-retraction-wheel, respectively for storage substantially within confines of said housing assembly.

2. The headphone cord retraction system of claim 1 wherein said headphone wiring comprises a microphone.

3. The headphone cord retraction system of claim 2 wherein said first headphone and said second headphone are able to be removably coupled into a first-ear and a second-ear, said first headphone and said second headphone comprising earbuds.

4. The headphone cord retraction system of claim 3 wherein said retraction assembly comprises a ratcheting means suitable for stop-and-go control.

5. The headphone cord retraction system of claim 3 wherein said housing assembly comprises outer-periphery-receivers.

6. The headphone cord retraction system of claim 5 wherein said outer-periphery-receivers are structured and arranged to allow said first headphone and said second headphone to be inserted therein to prevent said first headphone and said second headphone from ingressing into said housing assembly during said non-use condition.

7. The headphone cord retraction system of claim 6 wherein said front-housing-member and said back-housing-member snap-couple together.

8. The headphone cord retraction system of claim 7 wherein said housing assembly comprises a cylindrical profile when snap-coupled.

9. The headphone cord retraction system of claim 8 wherein said headphone wiring is bifurcated a distance from said first-terminal-end and said second-terminal-end to allow for range of motion when inserting said first headphone and said second headphone into to said first-ear and said second-ear.

10. The headphone cord retraction system of claim 9 wherein said first-retraction-wheel and said second-retraction-wheel rotate dependent on each other's relative rotational displacement.

11. The headphone cord retraction system of claim 10 wherein said third-retraction-wheel rotation is not dependent on displacement of said relative rotational displacement of said first-retraction-wheel and said second-retraction-wheel.

12. The headphone cord retraction system of claim 11 wherein said first-retraction-wheel, said second-retraction-wheel and said third-retraction-wheel are able to freely rotate in relation to said housing assembly, said first-retraction-wheel, said second-retraction-wheel and said third-retraction-wheel mounted on a first-shaft, a second-shaft, and a third-shaft respectively.

13. The headphone cord retraction system of claim 12 wherein said first-retraction-wheel, said second-retraction-wheel and said third-retraction-wheel each comprise a reel.

14. The headphone cord retraction system of claim 13 wherein said first-retraction-wheel, said second-retraction-wheel and said third-retraction-wheel are oriented within said housing assembly in a triangular orientation, said third-retraction-wheel nearest a bottom of said housing assembly when used.

15. The headphone cord retraction system of claim 14 wherein said housing assembly comprises at least one hinge such that said front-housing-member and said back-housing-member are able to swing open and closed in relation to one another.

16. The headphone cord retraction system of claim 1 wherein said first headphone and said second headphone are able to be removably coupled adjacent a first-ear and a second-ear, said first headphone and said second headphone external to said first-ear and said second-ear.

17. A headphone cord retraction system comprising:
a headphone-cord-retraction-assembly including;
a housing assembly comprising;
a front-housing-member; and
a back-housing-member; and
a retraction assembly including;

a first-retraction-wheel with a first-retraction spring;
a second-retraction-wheel with a second-retraction spring; and
a third-retraction-wheel with a third-retraction spring;

wherein said headphone cord retraction system comprises said headphone-cord-retraction-assembly;

wherein said headphone-cord-retraction-assembly comprises in functional combination said housing assembly, and said retraction assembly;

wherein said housing assembly comprises in coupled communication said front-housing-member and said back-housing-member which envelopes said retraction assembly to provide substantially enclosed storage means for headphone wiring, said headphone wiring able to be retracted for non-use conditions and extended to a user-determined length for in use conditions;

wherein said housing assembly comprises outer-periphery-receivers;

wherein said headphone wiring is attached on a first-terminal-end to a first headphone and a second headphone is attached on a second-terminal-end;

wherein said headphone wiring is attached on a third-terminal-end to a jack;

wherein said jack is structured and arranged to removably-couple to a sound-providing source;

wherein said outer-periphery-receivers are structured and arranged to allow said first headphone and said second headphone to be inserted therein to prevent said first headphone and said second headphone from ingressing into said housing assembly during said non-use condition;

wherein said housing assembly comprises a cylindrical profile when snap-coupled;

wherein said housing assembly comprises at least one hinge such that said front-housing-member and said back-housing-member are able to swing open and closed in relation to one another;

wherein said headphone wiring comprises a microphone;

wherein said headphone wiring is bifurcated a distance from said first-terminal-end and said second-terminal-end to allow for range of motion when inserting said first headphone and said second headphone into to said first-ear and said second-ear;

wherein said first headphone and said second headphone are able to be removably coupled to a first-ear and a second-ear, respectively, of a user-wearer;

wherein said first headphone and said second headphone are able to be removably coupled into a first-ear and a second-ear, said first headphone and said second headphone comprising earbuds;

wherein said retraction assembly comprises in functional combination said first-retraction-wheel, said second-retraction-wheel, and said third-retraction-wheel;

wherein said first-retraction spring, said second-retraction spring, and said third-retraction spring operate in unison to allow evenly displaced retraction and extension of said headphone wiring, as manipulated by said user-wearer;

wherein said retraction assembly comprises a ratcheting means suitable for stop-and-go control;

wherein said first-retraction-wheel, said second-retraction-wheel and said third-retraction-wheel each comprise a reel;

wherein said first-retraction spring, said second-retraction spring, and said third-retraction spring control operation of said first-retraction-wheel, said second-retraction-wheel, and said third-retraction-wheel, respectively, such that said first-retraction-wheel, said second-retraction-wheel, and said third-retraction-wheel are able to be controllably-rotated to dispense-unwind and alternately receive-wind said headphone wiring about said first-retraction-wheel, said second-retraction-wheel, and said third-retraction-wheel;

wherein said first-retraction spring, said second-retraction spring, and said third-retraction spring are engaged into an in-tension state as said headphone wiring is extended out of said housing assembly to a desired stopping point whereby said headphone wiring is able to be temporarily held in stasis for an in-use condition;

wherein said first-retraction-wheel, said second-retraction-wheel and said third-retraction-wheel are oriented within said housing assembly in a triangular orientation, said third-retraction-wheel nearest a bottom of said housing assembly when used;

wherein said first-retraction-wheel, said second-retraction-wheel and said third-retraction-wheel are able to freely rotate in relation to said housing assembly, said first-retraction-wheel, said second-retraction-wheel and said third-retraction-wheel mounted on a first-shaft, a second-shaft, and a third-shaft respectively; and wherein once said user-wearer disengages said headphone wiring from said in-use condition into said non-use condition said headphone wiring is able to be sequentially retracted onto said first-retraction-wheel, said second-retraction-wheel, and said third-retraction-wheel, respectively for storage substantially within confines of said housing assembly.

18. The headphone cord retraction system of claim 17 further comprising a kit including:
said headphone-cord-retraction-assembly;
said headphone wiring comprising said microphone, said jack and said first headphone and said second headphone; and
a set of user-instructions.

* * * * *